United States Patent
Lohmar et al.

(10) Patent No.: US 9,712,585 B2
(45) Date of Patent: Jul. 18, 2017

(54) PROCESSING OF MULTIMEDIA DATA

(71) Applicant: TELEFONAKTIEBOLAGET L M ERICSSON (publ), Stockholm (SE)

(72) Inventors: Thorsten Lohmar, Aachen (DE); Ibtissam El Khayat, Glons (BE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 216 days.

(21) Appl. No.: 14/442,334

(22) PCT Filed: Nov. 12, 2013

(86) PCT No.: PCT/EP2013/073559
§ 371 (c)(1),
(2) Date: May 12, 2015

(87) PCT Pub. No.: WO2014/076052
PCT Pub. Date: May 22, 2014

(65) Prior Publication Data
US 2016/0277466 A1 Sep. 22, 2016

Related U.S. Application Data

(60) Provisional application No. 61/725,696, filed on Nov. 13, 2012.

(51) Int. Cl.
*H04L 29/06* (2006.01)
(52) U.S. Cl.
CPC .......... *H04L 65/60* (2013.01); *H04L 65/4076* (2013.01); *H04L 65/4084* (2013.01); *H04L 65/80* (2013.01)
(58) Field of Classification Search
CPC ..... H04L 65/4076; H04L 65/60; H04L 65/80; H04L 65/4084
See application file for complete search history.

(56) References Cited

U.S. PATENT DOCUMENTS

2011/0246563 A1 10/2011 Keum et al.
2012/0042050 A1 2/2012 Chen et al.

FOREIGN PATENT DOCUMENTS

| JP | 2015505226 A | 2/2015 |
| RU | 2353069 C2 | 4/2009 |

(Continued)

OTHER PUBLICATIONS

Thorsten Lohmar et al, Dynamic adaptive HTTP streaming of live content, Jun. 20, 2011, IEEE, pp. 1-8.*

(Continued)

*Primary Examiner* — Chris Parry
*Assistant Examiner* — Stephen Houlihan
(74) *Attorney, Agent, or Firm* — Rothwell, Figg, Ernst & Manbeck, P.C.

(57) ABSTRACT

The invention relates to techniques for providing media content in a broadcast scenario to a streaming player, like a DASH player. In order to compensate a problem of variable segment sizes, which leads to the variation in the reception intervals of the media segments, it is proposed to estimate the segment availability time for requesting sub-sequent media segments. The estimation considers a correction value compensating the variation in a reception intervals of media segments so that the streaming player receives the media segments at a constant time interval, namely at the segment duration. In one embodiment it is proposed to use the value of the minBufferTime from the MPDfile, The min Buffer-Time is namely an indication of the varying segment size of the media content. The minBufferTime indicates the time needed for buffering a media content before starting playing out said media content. The estimation may be done on the client, user equipment UEor on the server device side. If the US is correcting the segment availability, then the UE uses the time of a first segment reception as base. If the server is (Continued)

correcting the segment availability then it uses the original segment avail-ability time at the server as base plus end-to-end delay.

30 Claims, 5 Drawing Sheets

(56) References Cited

FOREIGN PATENT DOCUMENTS

| WO | 2005069624 A2 | 7/2005 |
|---|---|---|
| WO | 2011122909 A2 | 10/2011 |
| WO | 2012021543 A1 | 2/2012 |
| WO | 2012089251 A1 | 7/2012 |

OTHER PUBLICATIONS

Office Action issued by the Japanese Patent Office in corresponding Application No. 2015-541178, dated Jul. 29, 2016, 4 pages.

Office Action and Search Report issued in corresponding Application No. RU 2015122492/08(035161), dated Aug. 17, 2016, 4 pages (Translation Only).

Michalos, M.G. et al, "Dynamic Adaptive Streaming over HTTP," Journal of Engineering Science and Technology Review 5 (2) (2012), pp. 30-34.

Lohmar, Thorsten et al., "Dynamic Adaptive HTTP Streaming of Live Content," World of Wireless, Mobile and Multimedia Networks (WOWMOM), XP032047733A, IEEE, Jun. 20, 2011, 8 pages.

Qualcomm Incorporated, "MPD Profiling to Support DASH over MBMS," 3GPP TSG-SA4 Meeting #68, S4-120448, Apr. 16-20, 2012, 8 pages.

International Search Report and Written Opinion issued in corresponding application No. PCT/EP2013/073559 dated Jan. 30, 2014, 12 pages.

Second Written Opinion issued in corresponding application No. PCT/EP2013/073559 dated Nov. 18, 2014, 7 pages.

International Preliminary Report on Patentability issued in corresponding application No. PCT/EP2013/073559 dated Jan. 30, 2015, 17 pages.

"3rd Generation Partnership Project; Technical Specification Group Services and System Aspects; Multimedia Broadcast/Multicast Service (MBMS); Protocols and codecs (Release 10)," 3rd Generation Partnership Project, 3GPP TS 26.346 V10.3.0, Mar. 2012, 162 pages.

"3rd Generation Partnership Project; Technical Specification Group Services and System Aspects; Transparent end-to end Packet-switched Streaming Service (PSS);Progressive Download and Dynamic Adaptive Streaming over HTTP (3GP-DASH) (Release 10)," 3rd Generation Partnership Project, 3GPP TS 26.247 V10.1.0, Mar. 2011, 113 pages.

* cited by examiner

PROCESSING OF MULTIMEDIA DATA

CROSS REFERENCE TO RELATED APPLICATION(S)

This application is a 35 U.S.C. §371 National Phase Entry Application from PCT/EP2013/073559 filed Nov. 12, 2013, which claims priority to U.S. Provisional Application No. 61/725,696, filed Nov. 13, 2012. The above identified applications are incorporated by reference in their entirety.

TECHNICAL FIELD

The present disclosure relates to techniques for providing media data to a user being sent on a transmission link with varying transmission delays.

This present disclosure may be practiced within network solutions using broadcast transmission techniques providing a transmission of media segments. In particular the embodiments discussed herein may be used in a scenario using MBMS, eMBMS transmission of media segment or other broadcast transmission techniques like IP-Multicast in DSL access system (IPTV) or DVB-S.

BACKGROUND

The adaptive HTTP streaming techniques rely on the client selecting media quality. The server or content provider describes all available quality representations and the way of fetching them in a so called manifest file, for example the representations of the media content may differ regarding the different media bitrates and the way to access the representations from the server. The manifest file is fetched at least once at the beginning of a streaming session and may be updated during the session. DASH Dynamic adaptive streaming over HTTP is an adaptive streaming technique, which adjusts the media stream to the currently available link bitrates as disclosed in "Dynamic adaptive streaming over HTTP (DASH)—Part 1: Media presentation description and segment formats", ISO/IEC 23009-1:2012(E), Version 2.1c2.

DASH is designed as a client controlled adaptive HTTP streaming protocol. That means, that the server describes a set of available media qualities for example in a manifest file and the client selects depending on the link bitrate the media representation (i.e. media bitrate) matching the link bitrate. In general the DASH solution comprises a DASH server being adapted to provide content with different media qualities, so called representations and on the client side a DASH client is adapted to request the media content with different qualities.

Most of the adaptive HTTP Streaming techniques require a client to continuously fetch media segments from a server. A certain amount of media time (e.g. 10 sec of media data) is contained in the media segment. Each segment of a particular media representation is made available at the server at a particular time indicated in the manifest. The way of creation of the URLs on the client side for downloading the segments of the different quality representation is described also in the manifest.

FIG. 1 depicts the principle of segments fetching in a DASH environment. The client, a DASH client communicates with a server, a DASH server.

The manifest file is received as an answer of the HTTP GET manifest file message, 10, and processed to determine the possible qualities, 11. In the next step, 12, the client requests data at lowest quality, HTTP GET Segment#1 from Lowest Quality and a measurement of the downloading rate is performed, 13. The client continuously measures the link bitrate while receiving the media segments, 14, to determine the appropriate quality for the reception of the content data. The client may change to another quality representation at any time, if a decision is taken to change the representation, 15. In the embodiment according to FIG. 1 it is decided to request media data with a medium quality, HTTP GET Segment#2 from Medium Quality, 16, and to continue the measurement of the download rate, 17.

The manifest file needs to be available in order to process the media content being divided into media segments. The manifest file may be distributed separately, optionally in-band with the stream or via a separate service announcement method. In case of Apple's HLS, the manifest is formatted as a Playlist file in m3u8 format. In case of 3GPP/MPEG DASH, the manifest is an XML structure called MPD Media Presentation Description file. The MPD comprises lists or means to generate the lists of the URLs of all media segments, which belong to the media session and which are used to fetch the next media segment.

There is also the possibility to deliver DASH media segments over broadcast systems such as eMBMS (LTE Multimedia Broadcast Multicast Service). Broadcast is efficient, when many users in a cell or any broadcast area use the same bitstream quality. Thus, it is possible that the same service is broadcasted for example in urban areas at a higher bitrate and with a lower bitrate in sub-urban areas simultaneously to a number of users.

Thus, the DASH player may receive content via broadcast or unicast. However a DASH Player has no information, whether the phone is within broadcast and/or unicast coverage. A Live Encoder LE at the server side generates a MPD and is also not aware of whether this file is to be used by unicast or broadcast and in many cases the same content will be distributed both on unicast and broadcast.

Furthermore, the DASH operates by segmenting the continuous media content stream into a sequence of media segments. A DASH segment is typically subdivided by the Live Encoder LE or Segmenter into multiple transport protocol segments, like a TCP or UDP segments, wherein the segments have a roughly constant duration of time, the so called segment duration.

A new MPD is fetched from the server when the current playback time gets close to the end of the media described in the MPD, or reaches a time since last check that is longer than the minimal update time signalled in the MPD.

The media segments are on average 100 kByte size, however some may be larger, e.g. up to 130 kByte and some smaller, e.g. up to 70 kByte, then when generating the media segments, each segment having a segment duration might have a different number of TCP or respectively of UDP segments. The segment size depends also on the chosen representation. The client can choose to switch among representations to adapt the bitrate. Finally the client fetches the sorted sequence of files and concatenates back the files into a continuous media stream and the content is played out and segments are continuously requested.

When running DASH over LTE Broadcast (eMBMS), the Live Encoder uploads the media segments into a Broadcast Multicast Server (BM-SC). FLUTE protocol in the BM-SC cares about partitioning the media file into a sequence of media segments, here of UDP packets or segments. Each UDP packet is uniquely marked with a sequence number, so that the client can re-assemble the file.

The IETF FLUTE protocol (RFC 3926) is used for file delivery over a broadcast transmission. The FLUTE delivery session is defined by an SDP (Session Description Protocol) file, which contains all parameters such as IP Multicast address, UDP port and but also a TMGI (Temporary Mobile Group Identity) for MBMS to allow a client to receive a mobile file broadcast delivery. Thus, FLUTE is a protocol, which allows delivery of files over broadcast links using UDP as a transport protocol.

The DASH Player fetches a sequence of media segments as independent files using the URL as provided in the manifest (called MPD in case of DASH). When sending DASH over MBMS, the segments are not fetched by the client from the remote server. Instead, the segments are pushed using FLUTE over broadcast.

In the broadcast scenario, a media segment must be first received by the eMBMS client, before it can be made available to the DASH player. This is a penalty for broadcasted representations over unicast representations. The DASH player does not know, whether or not the UE (User Equipment) is within broadcast coverage. The DASH player orders the subsequent data segments at the time as stated in the MPD file. However in case of broadcast at the requested time the media segment may not be available at the server, and not in the local cache at UE. Thus, the DASH player asks for a segment which is not received yet.

Also in case of broadcast the segments are on average 100 kByte size, some are larger, e.g. up to 130 kByte and some are smaller, e.g. up to 70 kByte, then when generating the segments, each segment might have a different number of UDP segments. In case of broadcast there is a constant bitrate bearer allocated for broadcast transmission. For example the allocated bitrate might be 1 Mbps that means that it takes 0.5 sec for a segment of size 500 kb to be transmitted and a segment of size 1500 kb needs 1.5 sec. The different size of the media segments leads to varying segment duration during the transmission of the segment and consequently the reception time interval for a complete reception of a media segment varies. However, the DASH Player assumes that media segments are made available with a fixed interval, namely segment duration.

Furthermore, the end to end delay between the BM-SC down to the UE differs from a system to another. It depends on how certain parameters have been configured on the eNodeB, but also on the network deployment. The speed of the BM-SC hardware has also an impact on the end-to-end system. For this reason the end-to-end delay can largely differ between different vendors and even between two systems served by different BM-SC when providing media segments.

However, these different systems are served by one live encoder for which the system deployments are completely transparent. Therefore the LE generates on one side different segment sizes, which take respectively different time duration for the transmission via a network and on the other side due to the varying end-to-end delay in the network, the variation in the time transmission of a media segment is intensified.

Furthermore, UEs are not always time synchronized with the system. Some form of mobile device clock time synchronization is necessary because hardware clocks drift from each other over time, with different clocks from different platforms having different drift rates depending on device characteristics and external effects of variations in temperature, vibration, and humidity. There is a well-known issue that various devices from different operators have time accuracy issues. Some only a few seconds, some a few minutes or more. Consequently, the drift rates of the clocks influence further the different segment reception time of the media segments.

Further, MPEG DASH uses the wallclock time to calculate the segment availability on the server. That requires that UEs are properly time-synchronized with the system, so that the UE can precisely calculate the reception of the most recent media Thus, all the mentioned aspects leads to increasing of the varying transmission duration of media segments over the constant bitrate bearer and consequently in varying of time intervals in reception of media segments leading to situation that the DASH player when ordering the subsequent segment may get regularly an error message, if the media segment is not available by the requested time.

SUMMARY

There is a demand for a technique for an efficient provision of media data to a user. In particular there is a demand to increase the experience level of the presented data.

The invention is embodied in independent claims. Advantageous embodiments are described in the dependent claims.

The demand is satisfied with a method for providing media content comprising media segments to a streaming player wherein the media segments are transmitted from a server device to a streaming player. Preferably the transmission is done over a broadcast transmission. The method comprises receiving of a first media segment and determining in the next step time of reception of the first media segment. Further a media segment availability time for requesting subsequent media segments is estimated by modifying the determined time of the reception of the first media segment with a correction value compensating a variation in a reception intervals of media segments so that the streaming player receive the media segments at a constant time interval. Finally the estimated availability time is signaled to the streaming player.

Further the demand is satisfied with a method for providing media content comprising media segments to a streaming player wherein the media segments are transmitted from a server device to a streaming player. Preferably the transmission is done over a broadcast transmission. In a first step of the method, an original media segment availability time indicating time the media segment are made available for transmission at the server device is estimated. As next a media segment availability time for requesting subsequent media segments is estimated by modifying the original media segment availability time with a correction value compensating a variation in a reception intervals of media segments so that the media segments are made available at the streaming player at a constant time interval and the estimated availability time is signaled to the streaming player.

Further the demand is satisfied with an user equipment UE which is configured for providing a media content comprising media segments to a streaming player wherein the media segments are transmitted from a server device to a streaming player, preferably over a broadcast transmission. The UE comprises a receiver adapted to receive a first media segment. Further the UE comprises a determination logic adapted to determine time of reception of the first media segment. Further the UE comprises an estimation logic adapted to estimate a media segment availability time for requesting subsequent media segments by modifying the determined time of the reception of the first media segment with a correction value compensating a variation in a reception intervals of media segments so that the streaming player receives the media segments at a constant time interval. Moreover there is a sender adapted to signal the estimated availability time to the streaming player.

Further the demand is satisfied with a server device which is configured for providing a media content comprising media segments to a streaming player wherein the media segments are transmitted from a server device to a streaming player. Preferably the transmission is done over a broadcast transmission. The server device comprises a receiver adapted to estimate an original media segment availability time indicating time the media segment are made available for transmission at the server device. Further the server device comprises a processor adapted to estimate a media segment availability time for requesting subsequent media segments by modifying the original media segment availability time with a correction value compensating a variation in a reception intervals of media segments so that the media segments are made available at the streaming player at a constant time interval. Moreover there is a sender adapted to signaling the estimated availability time to the streaming player.

BRIEF DESCRIPTION OF THE DRAWINGS

In the following, the invention will further be described with reference to exemplary embodiments illustrated in the figures, in which.

DETAILED DESCRIPTION

Figure 1:
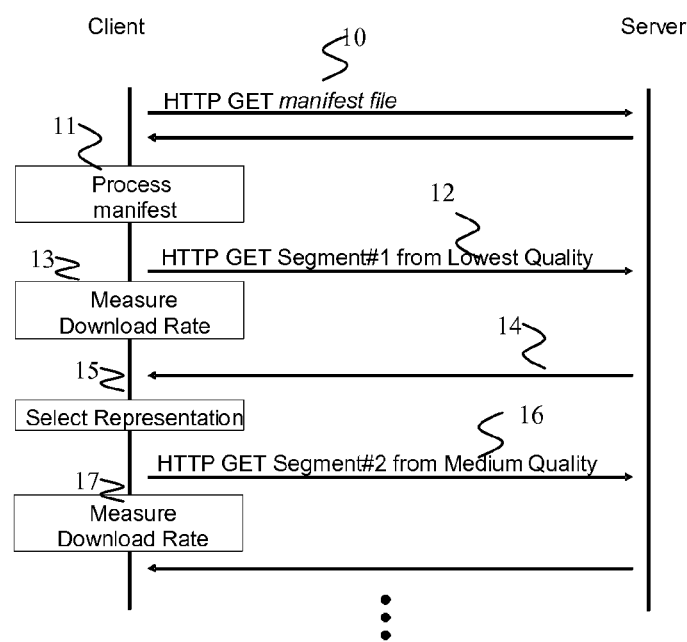
FIG. 1 shows an embodiment for fetching segments on an adaptive HTTP streaming client.

In the following description, for purposes of explanation and not limitation, specific details are set forth, such as particular network environments and communication standards etc., in order to provide a thorough understanding of the current invention. It will be apparent to one skilled in the art that the current invention may be practiced in other embodiments that depart from these specific details. For example, the skilled artisan will appreciate that the current invention may be practised with any wireless network like for example UMTS, GSM or LTE networks. As another example, the invention may also be implemented in short-range wireless networks such as WLAN or Bluetooth systems or in wireline networks, for example in any IP-based networks, like IMS network.

The invention may be practiced with certain broadcast networks, for example TV or with hybrid networks comprising a broadcast network and a mobile network, for example a DVB-H (Digital Video Broadcast-Handhelds) and a 3GPP mobile network. Basically, the invention may be practiced within any network environment in which video content may be distributed.

The media content may comprise video data, audio data, or any other kind of (multi)media data, such as, for example, a combination of video and audio data. The content may be provided within the framework of a multimedia service such as TV, a mobile TV or IPTV service. In the following the term media data, media content, content data are used as synonyms.

A media segment is generated form a continuous media data like for example a video clip and comprises a certain amount of data from a media content. A segment may be for example a DASH segment.

The terms Live Encoder LE, Live Segmenter, Live Transcoder are used synonymously and stands for a device comprising any Video Head-end equipment needed for creating a DASH Live content. In particular the LE is adapted to generate media segments from a continuous media content.

When new services or application or media content are provided then the corresponding Service Announcement (SA) attributes and description files are generated, like a User Service Description (USD) or the corresponding Session Description Protocol (SDP) or the corresponding Media Presentation Description (MPD) providing information for requesting the available media content. The USD file is a parent fragment for the SDP and MPD, which contains additional service parameters for MBMS User Services (3GPP TS 26.346 Rel-11). In the following the MPD manifest file is used, which is however not to be seen as a limitation for the present invention.

DASH Dynamic adaptive streaming over HTTP is a protocol used for provision of media content. Said content may be provided over the FLUTE protocol in case of broadcast transmission. As already mention the DASH protocol provide at the beginning of a session an MPD file which comprises information on how to request subsequent media segments. Among other information the URL of a media segment in a media content which is to be requested as next is provided.

A streaming player is a player on the client side adapted to provide the received streaming data to the user. Preferably the streaming player is an adaptive HTTP streaming player being arranged to adapt the reception rate of media data or media content to the available radio link rate. Further the streaming player is adapted to request media segments from a server. In one embodiment it is proposed that the streaming player is a DASH player, in particular an MPEG-DASH player. Other adaptive HTTP streaming schemes such as Apple HTTP Live Streaming may be supported as well.

A client might be any client device, like an end device or User Equipment (UE). In one embodiment the client comprises a streaming player, like a DASH player and a processor for performing the invention. However it may also be that the streaming player is not a part of the user equipment. In the following the terms client and user equipment UE are used as synonyms. If it is not mentioned explicitly the term client or UE is used in the sense of a processor performing the invention and providing the outcome to the streaming player.

The server device may be any device providing server functionality in the system and being adapted to perform the modification of a segment availability time, for example by modifying the MPD. In one embodiment the MPD may be modified by an entity that is acting as an interface between the LE and a UE. There may be also a dedicated service provisioning entity for this purpose. In a further embodiment, the MPD is modified directly by the BM-SC, since each BM-SC knows the end-to-end delay of the system it is managing.

The BM-SC is a broadcast server responsible for wrapping the DASH media segment into a broadcast suitable format. DASH media segments are typically larger than a single IP packet. In case of unicast, the segment needs to be sent using multiple TCP segments, as already mentioned. In case of broadcast, a segment is partitioned into multiple FLUTE/UDP packets. Optionally, FEC redundancy is calculated and added as overhead to the transmission of the segment. The BM-SC is repeating the procedure for each segment. When running DASH over LTE Broadcast (eM-BMS), the Live Encoder uploads media segments using e.g. WebDAV into the BM-SC. WebDAV is an RFC defined protocol for uploading files onto HTTP servers.

Segment availability is defined here as "the segment is ready now" to be provided to the streaming player. Another definition is that the media content for the media segment is now available to the live encoder and the segment becomes available for distribution at "segment availability time plus segment duration".

A correction value may depend on the segment size variability of the media segments.

The segment size variability is already caused by the Live Encoder LE. The media segments as generated by the LE have different sizes in the sense that they comprise a different number of data packets, like UDP or TCP data packets. The LEs are vendor specific. Each live encoder vendor has its own algorithms to increase compression efficiency while keeping a low end-to-end delay. Further the used profile is considered, like for example the excepted or set low end-to-end delay. This results in live encoder providing segment size variability. Further in case of broadcast a constant bitrate bearer on a transmission link is provided for transmitting the broadcasted data. Data segments with different segment sizes needs different time for transmission over a transmission link, which leads to variation in the reception intervals of the media segments. The LE, based on the media bitrate and the coded Picture Buffer knows for how long the UE should buffer the content before starting playing to avoid any underrun. Thus, an extra buffering of data on the client side is used to compensate the effects of variable segment sizes.

Further the correction value may also consider the end-to-end system delay and the drift ahead time.

In general it is proposed to provide a correction value in a way so that the streaming player finds the segments available at a constant reception interval, for example at segment duration. Usually it is expected to receive media segments at a constant reception interval, for example at segment duration. However due to the varying duration of the media segment transmission, for example due to the varying segment size, the reception interval, defined as the clock difference between the reception of consecutive segments, is not constant but varies. The task of the correction value is to compensate the variation in reception of the media segments.

In the following some observations in the behavior during a content downloading in case of unicast UC and broadcast BC are presented.

Figure 2:
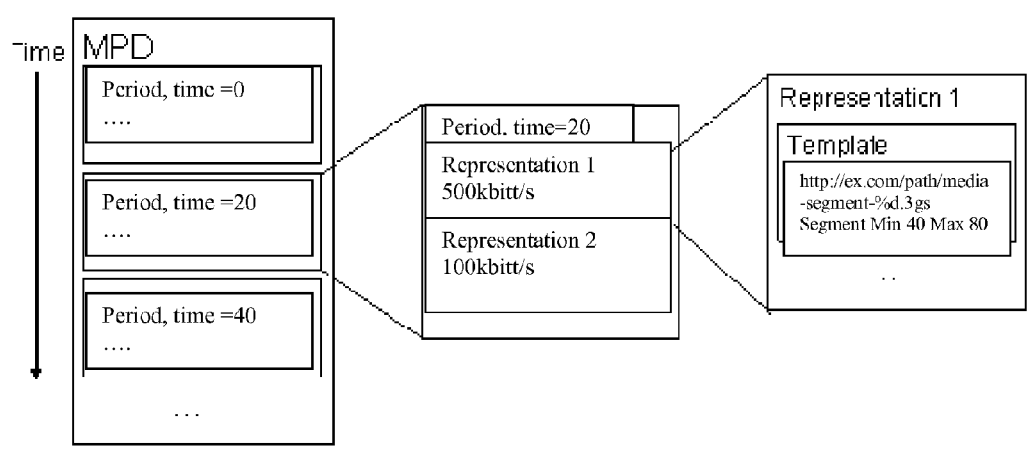
FIG. 2 shows an embodiment for using an MPD file.

In the following, according to FIG. 2 an MPD layout is presented. The MPD consists of three major components, namely periods, representations and segments. As depicted in FIG. 2, period components are the outermost part of the MPD. Periods are typically larger pieces of media that are played out sequentially. Inside a period, multiple different encodings of the content may occur. Each alternative is called a representation. These alternative representations can have, for example, different bitrates, frame rates or video resolutions. Finally, each representation describes a series of segments by HTTP URLs. Those URLs are either explicitly described in the representation for example in form of a playlist or described through a template construction, which allows, the client to derive a valid URL for each segment of a representation. The MPD format is flexible and can support other media container formats such as MPEG-2 TS.

In a template form, as shown in the third box in FIG. 2, the URL is constructed by replacing a certain part of the template by the index i. A template form may have the following form in C printf format:
http://ex.com/path/media-segment-%d.3gs
where %d is replaced by the value of i to result in the URL to be used for requesting the subsequent media segments If a segment with the index 10 is to be requested, so when i==10, then the URL has the form:
"http://ex.com/path/media-segment-10.3gs", and when i==11 then the address is: http://ex.com/path/media-segment-11.3gs.

When the URLs are provided in a form of a playlist, the receiver can regard the list of URLs as an array and i as the index in the array pointing to the relevant media segment, wherein the array starts usually at value one.

The MPD may further contain information about the buffering at the UE side. The LE, based on the media bitrate and the coded Picture Buffer knows for how long the UE should buffer the content before starting playing to avoid any underrun, so the LE determines the so-called minBufferTime. The minBufferTime informs the UE that said UE is supposed to buffer the content for the minBufferTime duration after reception of the first bits in order to compensate the variation in a reception interval of media segments. Assuming that the segments of the representation are continuously delivered at hypothetical constant bitrate in bits per second (bps), then if the representation is continuously delivered at this bitrate, starting at any Service Access Point (SAP), which is a point, from where a UE can start rendering the content, that is indicated either by @startWithSAP being an MPD attribute or by any Segment Index box ('sidx' box), a client can be assured of having enough data for continuous playout providing playout which begins after minBufferTime*bandwidth bits have been received.

The MPD may also contain an availabilityStartTime, which is the time at which the first segment of the stream becomes available for download on the server. The client reads from the manifest file the start time of the live stream, specially, the availabilityStartTime. If the client is properly time synchronized, it can calculate the latest available media segment on the server, namely every duration time of a media segment. That means that the client when tuning in, can request the media segment i, which is calculated form the availabilityStartTime and the segment duration being sent in the MPD, so availabilityStartTime+i* segment duration is the time for requesting the next media segment.

Summarizing in simplified scenario, in case of unicast, the server makes the first media segment N available at time t and provides a MPD file to the client stating the availabilityStartTime of said segment. From time t on-wards, UEs can start downloading the segments by requesting the subsequent segments, wherein the client selects one (or more) suited representations and requests segments corresponding to the current local time at the client side. When requesting before time t, the server responds with an error message (404-file-not-found HTTP status message). The download of the segment takes some time, at least the segment duration. Therefore, the client buffers the received content of at least minBufferTime before starting the presentation. The minBufferTime gives namely the needed head room for the client to finish the download. It compensates download duration and its variations e.g. due to variable segment sizes.

In case of broadcast the server makes the first media segment N available to the BM_SC at time t. From time t on-wards, the BM_SC pushes the segments towards the client without waiting for any request. After some time the segment N becomes available on the UE, in particular in the client cache. During the downloading of the segment, the DASH player would get from the client an error message when requesting the segment, since said segment is not completely available in the cache at this time. The availabilityStartTime as stated in the MPD file and provided to the DASH player describes namely the time the first segment is available on the BM-SC.

According to the embodiments of the invention, the modification of the segment availability time is proposed. The embodiment considers that the value of the availabilityStartTime in the MPD is different for unicast and broadcast.

It is proposed that based on the segment availability time, the DASH player tunes its segment fetching process. For DASH over unicast, this segment availability is equal to the time the segments are made available on the server for transmission. In case of DASH over broadcast the segment availability is equal to the time the segments are made available on the UE for the DASH player.

Thus, in order to compensate a problem of variable segment sizes, which leads to the variation in the reception intervals of the media segments, it is proposed to estimate the segment availability time for requesting subsequent media segments. The estimation considers a correction value compensating the variation in a reception intervals of media segments so that the streaming player receives the media segments at a constant time interval, namely at the segment duration.

In one embodiment it is proposed to use the value of the minBufferTime from the MPD file. The minBufferTime is namely an indication of the varying segment size of the media content. The minBufferTime indicates the time needed for buffering a media content before starting playing out said media content. If the UE is correcting the segment availability, then the UE uses the time of a first segment reception as base. If the server device is correcting the segment availability then it uses the original segment availability time at the server as base.

Figure 3:
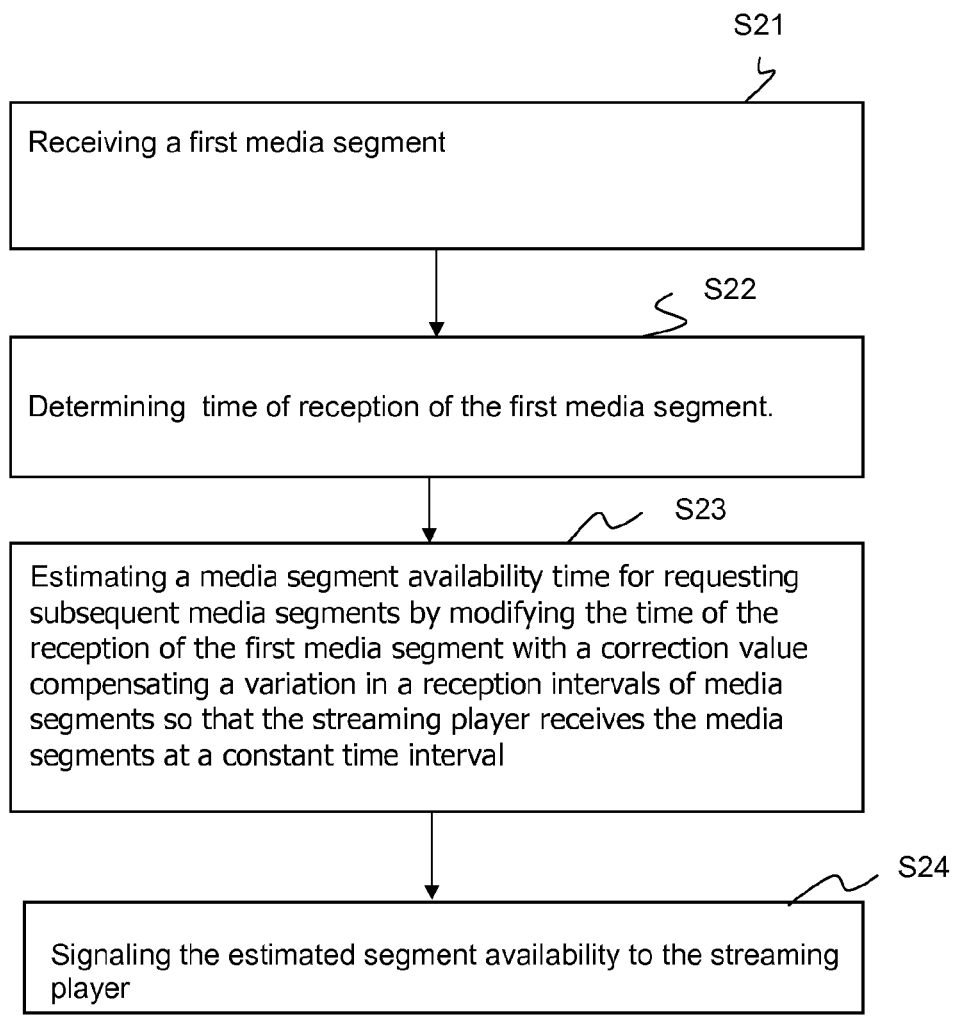
FIG. 3 shows a flowchart of a method in an user equipment according to one embodiment.

In the following an embodiment of the present disclosure is presented in respect to FIG. 3 showing a flow chart with steps according to an embodiment to be performed on the user side.

In step S21 UE receives a first media segment. The reception of the first segment means that the UE tune in into an ongoing broadcast stream. On tune-in to a live DASH over broadcast stream, the client waits for the reception of a first complete segment. Thus the received media segments are stored at the UE side before playing said segments, which means by providing them to the DASH player.

In the next step the UE determines the time of complete reception of the first media segment, S22.

In step S23 a segment availability time for a next media segment is determined by modifying the time of complete reception of the first media segment with a correction value compensating a variation in a reception intervals of media so that the streaming player receives the media segments at a constant time interval.

In the next step, S24, the estimated availability time is signaled to a player, like for example to the DASH player either by updating directly the MPD file or adding by a new HTTP header to the HTTP response and sending it back to the server for updating the MPD file.

In the following some steps of FIG. 3 are explained in more details.

The step of determining the time, S22 according to FIG. 3, comprises determining a local time at the user equipment at the reception of a complete media segment. The UE measures the time of complete reception of the media segment. The UE captures the time of the reception event using its own device time. Thus, the UE receives a signal, for example 13.05, that the segment has been received.

The step of determining the time, S22, comprises also an estimation of the segment number of the received first segment. The segment number is determined from a template form or from a playlist included in the received manifest file.

Thus, each segment is uniquely identified for example by a segment URL. Together with the MPD file, the client finds the segment number. In case a template based URL is used, the segment number is encoded within the URL, as described in respect to FIG. 2. In case a playlist based URL is used, the client needs to find the matching URL entry in the MPD and uses the URL entry index of the playlist table for finding the number of the received segment.

In the next step, S23 a segment availability time of the next segments is determined. This is done by estimating a new availabilityStartTime by taking the measured time of the reception of the first media segment with a correction value compensating a variation in a reception intervals of media segments so that the streaming player receives the media segments at a constant time interval.

In one embodiment it is proposed that the constant time interval is a segment duration, since at least segment duration is needed for requesting the next media segment.

In one embodiment it is proposed that the correction value compensates a varying segment size of the media segments, wherein the varying segment size leads to the variation in the reception intervals of the media segments.

In a preferred embodiment the minBufferTime is taken as a base for correction the availability time of the next segment. Thus, the correction value comprises a minBufferTime being an indication of the varying segment size by indicating time for buffering the media content before starting playing to avoid any underrun, wherein the minBufferTime is received in a manifest file.

The minBufferTime is read out of from the DASH MPD file. When generating the minBufferTime, the variable segment size is considered. Thus, the LE when setting the minBufferTime has information about the variability of the generated media segments. The minBufferTime is set to a value that prevents from under flowing the buffer, so it is ensured that enough data is available in the buffer before playing the content. Further, when generating the MPD file also the duration of a segment is known. The duration is also considered when generating the minBufferTime, then the DASH player has to wait for at least the duration of a segment before playing a segment. Therefore it is proposed in one embodiment to substruct the segment duration from the minBufferTime, in case the segment duration is included in the minBufferTime. Further it is proposed that the minBufferTime is modified by setting it to zero and wherein the modified minBufferTime is provided to the streaming player.

However the usage of the minBufferTime should not be seen as limitation. Alternatively, there may be an explicit variable segment size correction value compensating the varying segment size of the media segments. The value may be provided for example by the DASH MPD or even in the User Service Description (USD) fragment. Herein the estimation of the segment availability for the next segment time is done by correcting the time of complete reception of the first segment with a correction value provided explicitly.

In the following an example is shown. In this example it is proposed to estimate the new availability start time (NewAvst) by adding the minBufferTime to the measured time of a first segment reception wherein the first media segment is the current media segment in the media content and subtracting from the value the segment duration. This example should be seen as an example and not as a limitation. The minBufferTime and segment duration may be scaled by a coefficient ($\alpha$, $\beta$) to reduce the end-to-end delay while still fulfilling the requirement that there is no underrun by the data reception.

The embodiment is based on an estimation of the availability time of the received first segment, which is the current segment in the transmission of the media content. The estimation is based on a determination of a segment number of the media segment. The segment number is determined from a template form or from a playlist included in the received manifest file.

Thus, in the following embodiment the calculation is:

NewAvst =time_of_first_seg_received + minbufferTime − segment_duration
set minbuffertime=0
startNumber=current_index Thus, the client adds the minBufferTime value and subtracts segment duration from the MinBufferTime, in case the segment duration is included in the MinBufferTime.

Further it is proposed to modify the minBufferTime by setting it to zero and to modify the segment number by setting it to the segment number of the current media segment in the media content. Since the segments are played out in case of broadcast only when the segments are already received on the UE side, the minBufferTime can be set to zero, then in case of broadcast it is not necessary to wait for complete reception of a segment upon playing it out since the segment is already there. The current index is the number of the current segment which may be derived from the template form or alternatively from a playlist received with the manifest file. In case of a playlist all the items of the list preceding the current number are to be removed.

In the following the correction of the measured time is explained in more details according to an example.

Assuming that the original MPD contains the following values, wherein only the relevant parameters of an MPD file are shown:

availabilityStartTime= 1300h
startNumber = 1
Duration =10sec
minBufferTime=15sec Thus, the time at which the segment was available at the server is 1300 h, availabilityStartTime. It is to be noticed that at this time the first segment, startNumber 1 was available. The next segments are generated every 10 sec, then the segment duration Duration is 10 sec. Further the minBufferTime is set to 15 sec.

Assuming, that a client tunes in at a particular time and measures that the time of first segment reception at the client is 13:01:10, meaning 70 sec after starting the transmission.

The client determines from the received URL, http://hhhhiseg-8.3gs, that the received segment has the segment index 8. In case of a playlist the index of the segment URL is determined accordingly.

In the next step, the client creates a new MPD with the following values availabilityStartTime: 13:01:10 + 15sec −10sec = 13:01:15
startNumber= 8
Duration =10sec
minBufferTime=0sec Thus, the time of complete reception of the first segment, namely segment number 8 is 13:01:10, to which the minBufferTime derived from the original MPD message is added to compensate the variability of the segments and additionally the duration is subtracted, since the segment is already available at the client cache and therefore there is no need to consider the duration of transmission of the segment. The duration of the segments stays 10 sec and the minBufferTime is set to 0 since the value is already considered in the availabilityStartTime.

In the next step, the new generated availability time is provided to the DASH player. So that the DASH player takes the modified MPD file for ordering the next segments.

In this examples the next segment is to be ordered after the hypothetical segment duration of 10 sec, thus at 13:01:25. At this time the next segment is available and stored in the buffer, then it is the task of the LE to provide data in the way that they are available at the user side, for example by considering the minBufferTime.

In a further example it is proposed to correct the estimated segment availability time to the availabilityStartTime of a first segment in the media content, like the first segment in the tuned-in DASH stream. The estimation is based on the determination of the first segment number in the media content, usually numbered with 1.

Thus, the reception of a first segment of a complete media stream is used for correction of the availability of the first segment of the actual DASH stream. This solution is advantageous when the MPD contains a presentationTimeOffset value, which prevents modifying the startNumber in the MPD file. The presentationTimeOffset describes the position of the segment on the media timeline.

In this case, the correction value is updated by subtracting the segment duration passed between the first media segment in the media content and current media segment in the media content (segment Index) from the minBufferTime. This example should be seen as an example and not as a limitation. The minBufferTime and segment duration may be scaled by a coefficient ($\alpha$, $\beta$) to reduce the end-to-end delay while still fulfilling the requirement that there is no underrun by the data reception.

Thus, the UE receives a first segment when tuning in. Further the UE has an MPD file available. The UE reads the segment number of the received segment and performs the following calculation:

NewAvst= time_of_first_seg_received + min_buffer − ((SegmentIndex-startNumber) * SegDuration)
set minbuffertime=0

Herein, the NewAvst is the new calculated availability time, the time_of_first_seg_received is the time of reception of the first segment, SegmentIndex is the number of the first received segment or in other words of the current segment and the startNumber is the number of the first segment in the media content session, which is preferably set with 1. Thus, if the determined segment index is 8 and the first segment was indexed with 1, the current received media segment is 7.

Said calculation is explained in the following based on an example. Assuming that the original MPD contains the following information:

avaliabilityStartTime= 1300h
startNumber = 1
Duration =10sec
minBufferTime=15sec and the time of first segment reception is 13:01:10, thus 70 sec after the start of the whole media content session, like a DASH session. Further the UE is adapted to read out the number of the received segment, for example from the received URL request message.

The received HTTP request of first received segment may have the following format:
http//hhhh/seg-8.3gs Thus, as explained above, the determined segment number is accordingly 8. Based on the determination of the segment number, the client calculates the new MPD value in the following way:

avaliabilityStartTime 13:01:10 + 15sec − ((8-1) * 10)= 13:00:15
startNumber= 1
Duration =10sec
minBufferTime=0sec It is proposed to modify the minBufferTime by setting it to zero and to set the segment number startNumber to the segment number of the first segment in the media content.

The purpose for the determination of the segment availability time for the first segment is also in this example to determine the segment availability times for all subsequent segments. Due to the corrections, the client can use this segment availability time of the first received segment to determine the segment availability times for all subsequent segments.

Coming back to FIG. 3, in step S23 a segment availability time for a next media segment is determined by modifying the time of complete reception of the first media segment with a correction value, wherein the segment availability time for a next media segment may be based either on estimation of the availability time of the first received segment (current media segment) or of the availability time estimated for the first segment in the DASH stream. Commonly, independent on the estimation of the segment index, the value of the time of complete reception of the first media segment is modified with a correction value compensating the variation of the reception interval of the media segments for example due to the varying segment size.

In the next step of FIG. 3, S24, the estimated availability time is signaled to a player, like for example to the DASH player either by updating directly the MPD file or adding by a new HTTP header to the HTTP response and sending it back to the server for updating the MPD file.

Thus, it is proposed that the step of signaling the estimated availability time to the streaming player S24 comprises updating the manifest file with the estimated availability time and providing the manifest to the streaming player.

Alternatively it is proposed that the step of signaling the estimated availability time to the streaming player S24 comprises adding a new HTTP header to a HTTP response and sending it back to the server device for updating the manifest file and providing said manifest file to the streaming player.

It is to be said that the MPD independently of how it has been modified, can be fetched using unicast or sent over a service announcement channel, for example any suitable broadcast channel. Further it is to be noticed that the MPD can be generated in advance.

Further it is proposed that the step of signaling the estimated availability time to the streaming player, S24, comprises signaling the modified minBufferTime and the segment number, for example by modifying the MPD file.

In a further embodiment, it is proposed to modify the availability of the segment on the server side.

Figure 4:
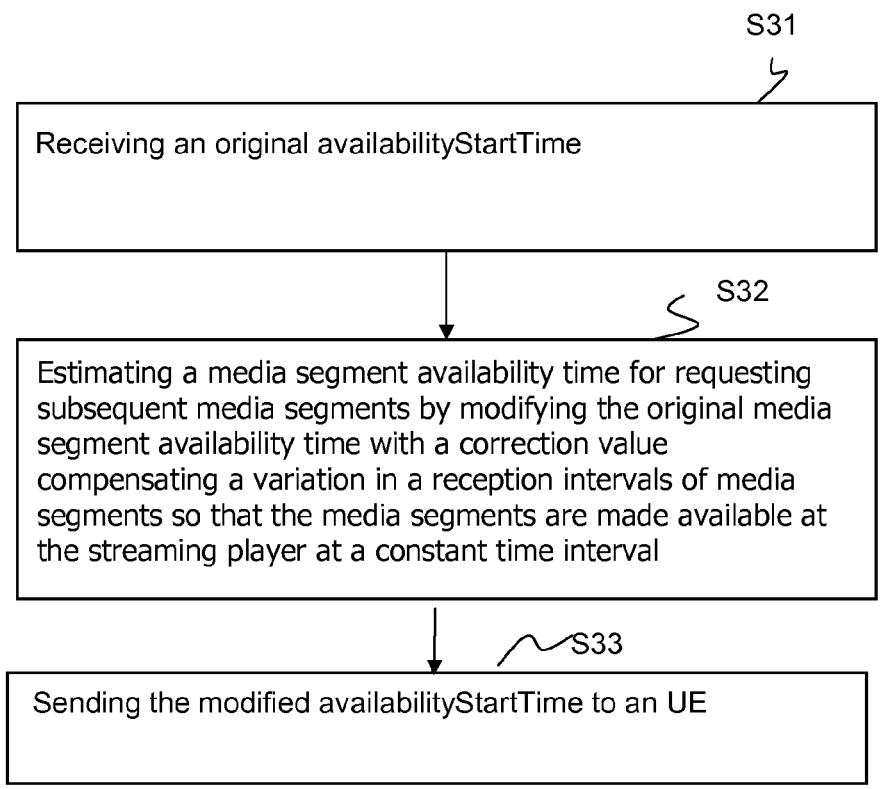
FIG. 4 shows a flowchart of a method in a server device according to one embodiment.

In the following embodiment according to FIG. 4 is presented.

In a first step, S31, the server takes an original availabilityStartTime for a particular media content session, like a DASH stream. The original availabilityStartTime means the time at which a segment is available for the transmission at the server and as calculated by the server device.

In the next step, S32, it is proposed that that the server side entity modifies the availabilityStartTime to comply with the rule "a new segment becomes available every segment duration on the UE side". Thus, it is proposed to use a correction value which compensates a variation in a reception intervals of media segments so that the media segments are made available at the streaming player at a constant time interval.

In one embodiment it is proposed that the correction value considers a varying segment size of the media segments and an end-to-end system delay, wherein the end-to-end system delay is the time needed to transport a media segment from a server device to a user equipment over the transmission link.

In one embodiment it is proposed that the correction value considers a varying segment size of the media segments. Preferably the correction value comprises a minBufferTime being an indication of the varying segment size by indicating time for buffering the media content before starting playing said media content Since the segments could be of different size the value of minBufferTime is included in the availabilityStartTime to prevent the UE for requesting a non-existing segment. As already said, by the generation of the minBufferTime the Live Encoder considers the variation of the segment size and add said value to the availabilityStartTime. Thus, the size of the minBufferTime compensates at least the variation of the segment sizes which are known to the live encoder. Therefore it is proposed to use the minBufferTime to ensure that a subsequent media segment becomes available every segment duration on the UE side.

Further it is proposed that the correction value comprises an end-to-end system delay (max_offset).

Thus, it is proposed that the server adds to the availabilityStartTime a correction value considering an end-to-end system delay and segment size variability. The end-to-end-delay time is the time needed to transport a segment from the BM-SC down to the UE, which is known to the server. However, each live encoder has its own "target bitrate" rule, which drives the different segment sizes and their variability. Therefore, the added value depends preferably on the Live Encoder implementation and the used delay profile, for example the excepted or set low end-to-end delay.

Further it is proposed that the correction value comprises a drift ahead value (maxdriftahead) indicating a maximum clock drift ahead. The maxdriftahead value represents the maximum clock drift that is acceptable. In other terms, if a UE clock drifts by more than this maximum value, the UE will not be capable of playing the media content and a synchronization of the UE clock will be required.

Thus, the new availability start time New Avst is calculated by taking the original availability start time ayst$_{org}$ as determined by the server and adding the MinBufferTime, min_buffer in order to include the minBufferTime to prevent the requesting of a non-existing segment. Further also the max_offset value is added, which is the maximum end-to-end delay. Said value is also known to the server device. The LE may serve different system with different end to end delays, and the max_offset value gives the maximal possible delay in delivery of segments. Further the maxdriftahead value is added.

$$\text{New Avst}=\text{avst}_{org}+\text{min\_buffer}+\text{max\_offset}+\text{maxdriftahead}$$

Further it is to be noticed that the correction value depends on a Live Encoder implementation and a delay profile.

In the next step, S33 it is proposed to send the modified availibilityStartTime to the streaming player. In particular it is proposed that the step of signaling the estimated availability time to the streaming player comprises replacing the original media segment availability time, availibilityStartTime, in a manifest file with the estimated media segment availability time and sending said manifest file to the streaming player.

In one embodiment it is proposed to modify the availibilityStartTime in the MPD file at the server side, wherein the newly created MPD contains the modified Avst value. In one embodiment it is proposed to set the minBufferTime may be set to zero (minbuffertime=0), in particular in case when the client is not allowed to change said timer. In a preferred embodiment the modified minBufferTime is provided to the streaming player with the manifest file.

Figure 5:
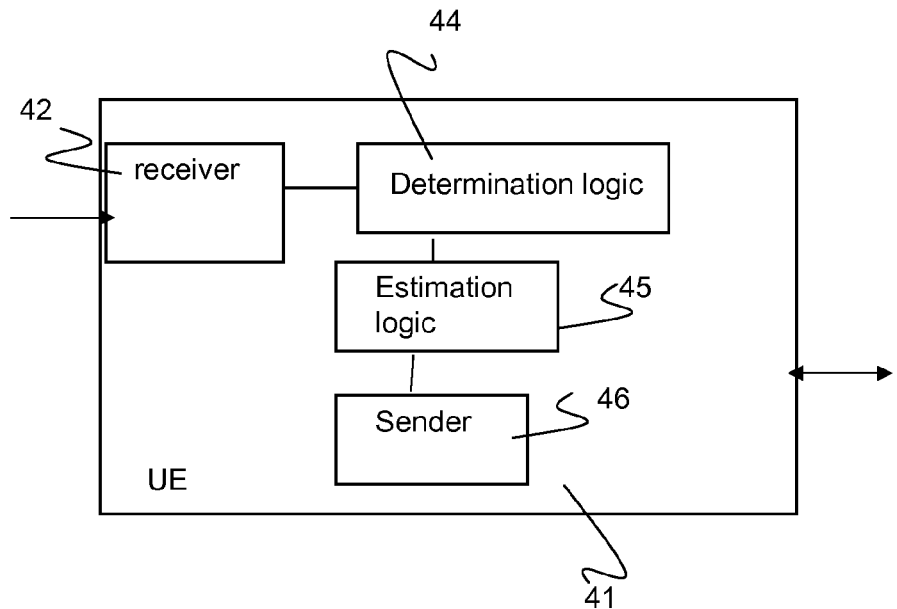
FIG. 5 schematically shows a an user equipment according to one embodiment.

FIG. 5 schematically illustrates exemplary structures for implementing the above-described concepts in an user equipment UE 41 which is configured for providing a media content comprising media segments to a streaming player wherein the media segments are transmitted from a server device to a streaming player over a broadcast transmission.

The UE comprises a receiver 42 adapted to receive a first media segment. Further the UE 41 comprises a determination logic 44 adapted to determine time of reception of the first media segment. Further the UE comprises an estimation logic 45 adapted to estimate a media segment availability time for requesting subsequent media segments by modifying the time of the reception of the first media segment with a correction value compensating a variation in a reception intervals of media segments so that the streaming player receives the media segments at a constant time interval. Moreover there is a sender 46 adapted to signal the estimated availability time to the streaming player.

Further the UE may comprise a modification logic (not shown) for modifying the manifest file. The modification may be done in any preferable way, for example by modifying an HTTP header or adding a new HTTP header for sending it to the streaming player. In a preferred solution the manifest file, like the MPD file is modified directly and provided to the streaming player.

It should be noted that FIG. 5 illustrates various functional units in the user equipment 41 and the skilled person is able to implement these functional units in practice using suitable software and hardware. Thus, the solution is generally not limited to the shown structures of the user equipment and the functional units 42-46 may be configured to operate according to any of the features described in this disclosure, where appropriate.

The functional units 42-46 described above may be implemented in the UE 41 by means of program modules of a respective computer program comprising code means which, when run by a processor causes the UE 41 to perform the above-described actions and procedures. The processor may comprise a single Central Processing Unit (CPU), or could comprise two or more processing units. For example, the processor may include a general purpose microprocessor, an instruction set processor and/or related chips sets and/or a special purpose microprocessor such as an Application Specific Integrated Circuit (ASIC). The processor may also comprise a storage for caching purposes.

Each computer program may be carried by a computer program product in the UE 41 in the form of a memory having a computer readable medium and being connected to the processor. The computer program product or memory thus comprises a computer readable medium on which the computer program is stored e.g. in the form of computer program modules. For example, the memory may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the UE 41.

Figure 6:
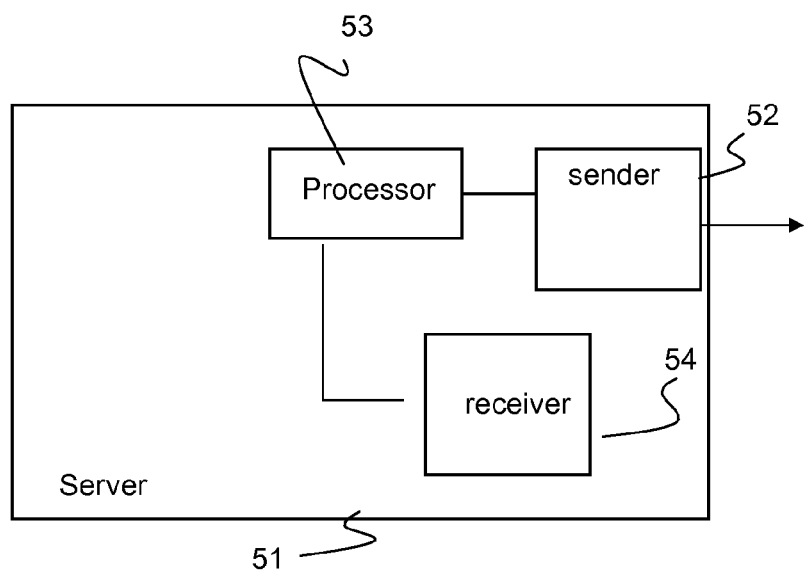
FIG. 6 schematically shows a server device according to one embodiment.
Figure 2:
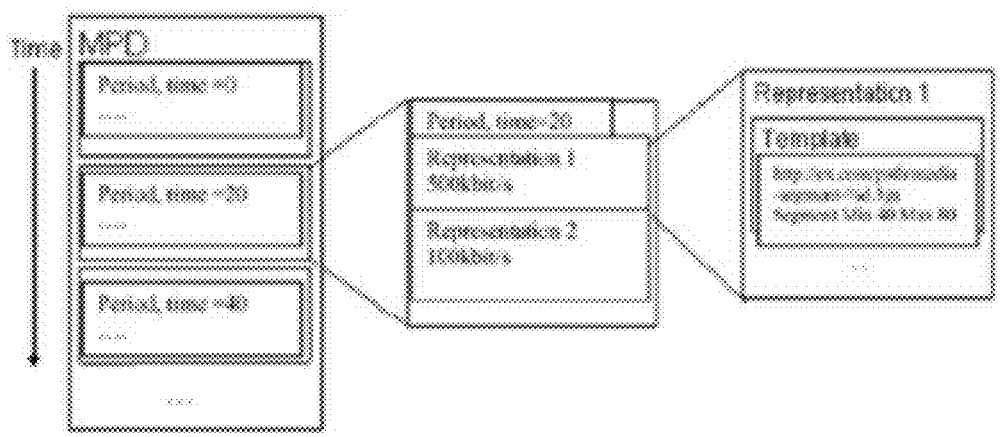

FIG. 6 schematically illustrates exemplary structures for implementing the above-described concepts on a server device 51 which is configured for providing a media content comprising media segments to a streaming player wherein the media segments are transmitted over a broadcast. The server device 51 comprises a receiver 54 adapted to estimate an original media segment availability time indicating time the media segment are made available for download at the server device receive, thus the original availibilityStartTime. Further the server device 51 comprises a processor 53 adapted to estimate a media segment availability time for requesting subsequent media segments by modifying the original media segment availability time, original availibilityStartTime, with a correction value compensating a variation in a reception intervals of media segments so that the media segments are made available at the streaming player at a constant time interval. Moreover there is a sender 52 adapted to signaling the estimated availability time to the streaming player.

It should be noted that FIG. 6 illustrates various functional units in the server device 51 and the skilled person is able to implement these functional units in practice using suitable software and hardware. Thus, the solution is generally not limited to the shown structures of the user equipment and the functional units 52-54 may be configured to operate according to any of the features described in this disclosure, where appropriate.

The functional units 52-54 described above may be implemented in the server device 51 by means of program modules of a respective computer program comprising code means which, when run by a processor causes the server device 51 to perform the above-described actions and procedures. The processor may comprise a single Central Processing Unit (CPU), or could comprise two or more processing units. For example, the processor may include a general purpose microprocessor, an instruction set processor and/or related chips sets and/or a special purpose microprocessor such as an Application Specific Integrated Circuit (ASIC). The processor may also comprise a storage for caching purposes.

Each computer program may be carried by a computer program product in the server device 51 in the form of a memory having a computer readable medium and being connected to the processor. The computer program product or memory thus comprises a computer readable medium on which the computer program is stored e.g. in the form of computer program modules. For example, the memory may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the server device 51.

It is to be understood that the examples and embodiments as explained above are merely illustrative and susceptible to various modifications. For example, the concepts could be used in other types of mobile communication networks, not explicitly mentioned so far. Further, it is to be understood that the above concepts may be implemented by using correspondingly designed software in existing nodes, or by using dedicated hardware in the respective nodes.

The invention claimed is:

1. A method for providing media content comprising media segments to a streaming player wherein the media segments are transmitted from a server device to a streaming player over a broadcast transmission, the method comprising:
    receiving, at a user equipment, a first media segment;
    determining a time of reception of the first media segment;
    estimating a media segment availability time for requesting subsequent media segments by modifying the determined time of the reception of the first media segment with a correction value compensating a variation in reception intervals of media segments so that the streaming player receives the media segments at a constant time interval; and
    signaling the estimated availability time to the streaming player being adapted to request media segments from the server, wherein
    the streaming player requests the subsequent media segments from the server based on the estimated availability time.

2. The method of claim 1, wherein the step of determining the time of receiving the first media segment comprises determining a local time at the user equipment at the reception of the first media segment completely.

3. The method of claim 1, wherein the step of determining the time of receiving the first media segment comprises an estimation of a segment number of the received first segment.

4. The method of claim 3, wherein the segment number is determined from one of: a template form and a playlist included in a received manifest file.

5. The method of claim 1, wherein the constant time interval is a segment duration.

6. The method of claim 1, wherein the correction value considers a varying segment size of the media segments, wherein the varying segment size leads to the variation in the reception intervals of the media segments.

7. The method of claim 6, wherein the correction value comprises a minBufferTime being an indication of the varying segment size by indicating time for buffering the media content before starting playing said media content.

8. The method of claim 5, wherein the minBufferTime is received in a manifest file received from the server device.

9. The method of claim 1, wherein the step of estimating the media segment availability time (Avst) is based on the estimation of the availability time of the received first media segment (time_of_first_seg_received), wherein the first media segment is the current media segment in the media content.

10. The method according of claim 9, wherein the correction value is updated by subtracting the segment duration from a minBufferTime.

11. The method of 10, wherein the minBufferTime is modified by setting it to zero and a segment number is set to a segment number of the current media segment in the media content.

12. The method of claim 1, wherein the step of estimating the media segment availability time is based on an estimation of the availability time of the received first media segment (time_of_first_seg_received) and on a first media segment in the media content (startNumber).

13. The method of claim 12, wherein the correction value is updated by subtracting the segment duration passed between the first media segment in the media content and current media segment in the media content (Segmentindex) from a minBufferTime.

14. The method of claim 13, wherein the minBufferTime is modified by setting it to zero and a segment number is set to a segment number of the first segment in the media content.

15. The method of claim 5, wherein the correction value is an explicit variable segment size value compensating the varying segment size of the media segments.

16. The method of claim 1, wherein the step of signaling the estimated availability time to the streaming player comprises updating a manifest file with the estimated availability time and providing the manifest to the streaming player.

17. The method of claim 1, wherein the step of signaling the estimated availability time to the streaming player comprises modifying an HTTP header or adding a new HTTP header to a HTTP response and sending it to the streaming player.

18. The method of claim 1, wherein the step of signaling the estimated availability time to the streaming player comprises further signaling a modified minBufferTime and a segment number.

19. A method for providing media content comprising media segments to a streaming player wherein the media segments are transmitted from a server device to a streaming player over a broadcast transmission, the method comprising the steps of and being performable at a server:
    estimating an original media segment availability time indicating time the media segment are made available for transmission at the server device;
    estimating a media segment availability time for requesting subsequent media segments by modifying the original media segment availability time with a correction value compensating a variation in a reception intervals of media segments so that the media segments are made available at the streaming player at a constant time interval; and
    signaling the estimated media segment availability time to the streaming player, wherein
    the streaming player is configured to request the subsequent media segments from the server based on the estimated availability time.

20. The method of claim 19 wherein the correction value considers a varying segment size of the media segments.

21. The method of claim 19, wherein the correction value comprises a minBufferTime being an indication of a varying segment size by indicating time for buffering the media content before starting playing said media content.

22. The method of claim 19 wherein the correction value comprises an end-to-end system delay (max_offset).

23. The method according to claim 19, wherein the corrections value comprises further a drift ahead value (maxdriftahead) indicating a maximum clock drift ahead.

24. The method according to claim 19, wherein the correction value depends on a Live Encoder implementation and a delay profile.

25. The method of claim 19, wherein the step of signaling the estimated availability time to the streaming player comprises replacing an original media segment availability time, availibilityStartTime, in a manifest file with the estimated media segment availability time and sending said manifest file to the streaming player.

26. The method of claim 24, wherein further a minBufferTime is modified by setting it to zero and wherein the modified minBufferTime is provided to the streaming player with a manifest file.

27. A user equipment device adapted to provide a media content comprising media segments to a streaming player wherein the media segments are transmitted from a server device to a streaming player over a broadcast transmission, the user equipment device comprising:
    a receiver for receiving a first media segment;
    a memory; and
    a processor coupled to the memory, wherein the processor is configured to:
    determine time of reception of the first media segment,
    estimate a media segment availability time for requesting subsequent media segments by modifying the determined time of the reception of the first media segment with a correction value compensating a variation in a reception intervals of media segments so that the streaming player receives the media segments at a constant time interval, and
    signal the estimated availability time to the streaming player, wherein
    the streaming player is configured to request the subsequent media segments from the server based on the estimated availability time.

28. The device of claim 27 wherein the device further comprises modification logic for modifying a manifest file with the estimated media segment availability time.

29. The device of claim 28, wherein the modification logic is adapted to modify an HTTP header or to add a new HTTP header for sending it to the streaming player.

30. A server device adapted to provide a media content comprising media segments to a streaming player wherein the media segments are transmitted from a server device to a streaming player over a broadcast transmission, the device comprising:
    a receiver adapted to estimate an original media segment availability time indicating time the media segment are made available for transmission at the server device;
    a processor adapted to estimate a media segment availability time for requesting subsequent media segments by modifying the original media segment availability time with a correction value compensating a variation in a reception intervals of media segments so that the media segments are made available at the streaming player at a constant time interval; and
    a sender adapted to signal the estimated availability time to the streaming player which is configured to request the subsequent media segments from the server based on the estimated availability time.

* * * * *

UNITED STATES PATENT AND TRADEMARK OFFICE
CERTIFICATE OF CORRECTION

PATENT NO. : 9,712,585 B2
APPLICATION NO. : 14/442334
DATED : July 18, 2017
INVENTOR(S) : Lohmar et al.

Page 1 of 3

It is certified that error appears in the above-identified patent and that said Letters Patent is hereby corrected as shown below:

On the Title Page

In Item (57), under "ABSTRACT", in Column 2, Line 12, delete "MPDfile," and insert -- MPDfile. --, therefor.

In Item (57), under "ABSTRACT", in Column 2, Line 18, delete "US" and insert -- UE --, therefor.

In the Drawings

Replace Fig. 2, Sheet 2 of 5, with the corrected Fig. 2, Sheet 2 of 5, as shown on the attached sheet.

In the Specification

In Column 2, Line 7, delete "FIG. 1" and insert -- FIG. 1, --, therefor.

In Column 2, Line 61, delete "Server" and insert -- Service Center --, therefor.

In Column 6, Line 4, delete "form a" and insert -- from a --, therefor.

In Column 8, Line 15, delete "i= =11 then" and insert -- i= =11, then --, therefor.

In Column 8, Line 48, delete "form" and insert -- from --, therefor.

In Column 11, Lines 64-65, delete "URL, http//hhhhiseg-8.3gs," and
insert -- URL, http//hhhh/seg-8.3gs, --, therefor.

In Column 12, Line 2, delete "values" and insert -- values: --, therefor.

In Column 15, Line 7, delete "ayst$_{org}$" and insert -- avst$_{org}$ --, therefor.

Signed and Sealed this
First Day of May, 2018

Andrei Iancu
*Director of the United States Patent and Trademark Office*

In the Claims

In Column 18, Line 9, in Claim 10, delete "according of" and insert -- according to --, therefor.

In Column 18, Line 12, in Claim 11, delete "of 10," and insert -- of claim 10, --, therefor.

In Column 18, Line 24, in Claim 13, delete "(Segmentindex)" and insert -- (SegmentIndex) --, therefor.

In Column 19, Line 8, in Claim 23, delete "corrections value" and insert -- correction value --, therefor.